(12) United States Patent
Damnjanovic et al.

(10) Patent No.: US 8,925,438 B1
(45) Date of Patent: Jan. 6, 2015

(54) COUNTERMEASURE TECHNIQUE USING AN APPROPRIATE FLUID SPRAY AGAINST INFRARED HEAT SEEKING MISSILE

(76) Inventors: Budimir Damnjanovic, Detroit, MI (US); Desanka Damnjanovic, Detroit, MI (US)

( * ) Notice: Subject to any disclaimer, the term of this patent is extended or adjusted under 35 U.S.C. 154(b) by 2167 days.

(21) Appl. No.: 11/881,492

(22) Filed: Jul. 28, 2007

(51) Int. Cl.
- *B64D 1/16* (2006.01)
- *F41H 11/02* (2006.01)
- *B64D 1/18* (2006.01)
- *B64D 7/00* (2006.01)
- *B64F 5/00* (2006.01)

(52) U.S. Cl.
CPC *F41H 11/02* (2013.01); *B64D 1/18* (2013.01); *B64D 7/00* (2013.01); *B64F 5/0081* (2013.01)
USPC ............................ 89/1.2; 102/367; 239/265.11

(58) Field of Classification Search
USPC .............. 239/265.11, 265.25, 265.19; 89/1.2, 89/1.11, 1.1; 102/334, 367
See application file for complete search history.

(56) References Cited

U.S. PATENT DOCUMENTS

| | | | | |
|---|---|---|---|---|
| 2,993,648 A | * | 7/1961 | Blackwell | 239/1 |
| 4,196,668 A | * | 4/1980 | Morlock et al. | 102/473 |
| 4,299,166 A | * | 11/1981 | Carignan et al. | 102/501 |
| 5,194,687 A | * | 3/1993 | Garfinkle | 89/1.11 |
| 6,098,402 A | | 8/2000 | Sawruk | |

* cited by examiner

*Primary Examiner* — Benjamin P Lee

(57) ABSTRACT

This invention relates to an improved countermeasure process for both military and civil commercial aircraft under an attack by an infrared heat seeking missile. The countermeasure process involves dispersing liquid substance under high pressure in a spray form rearward of the aircraft tail pipe into the wake of exhaust plume and into the path of trailing missile for the purpose of blinding its guidance system under the plastic dome, by distorting, disrupting and hindering its attack trajectory.

9 Claims, 1 Drawing Sheet

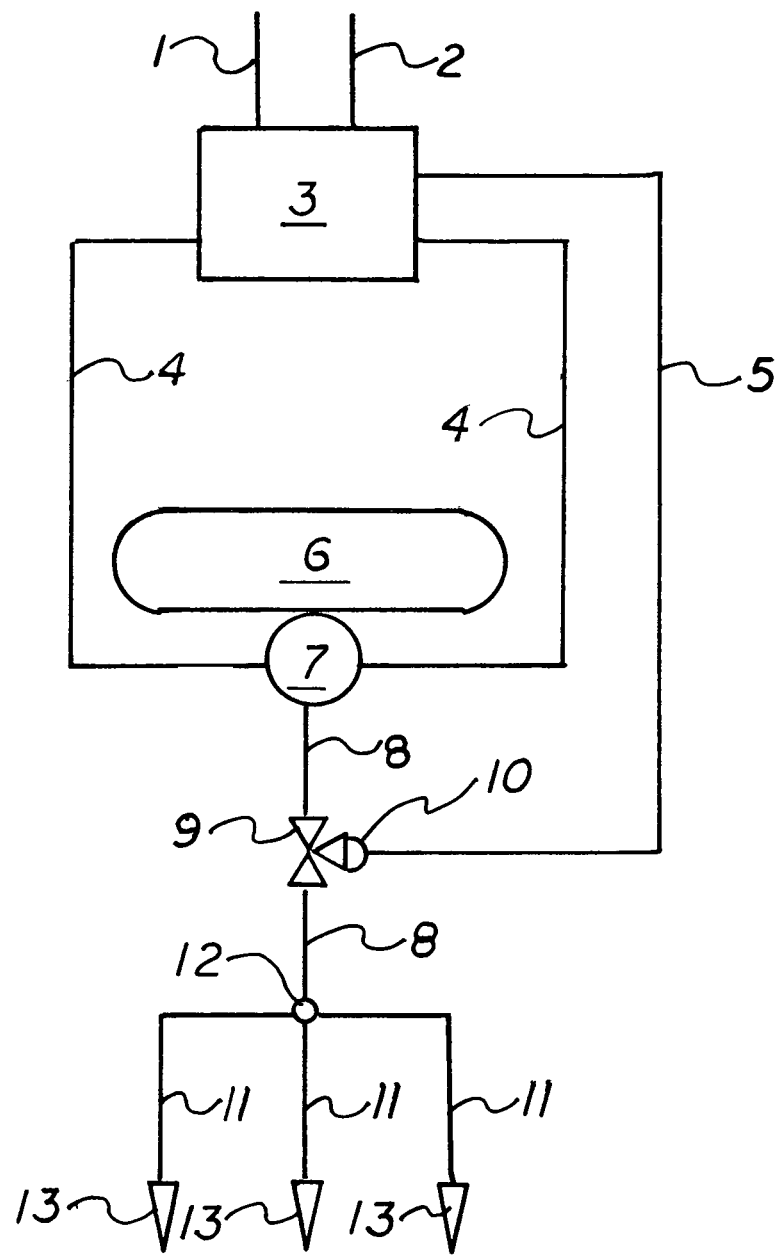

COUNTERMEASURE TECHNIQUE USING AN APPROPRIATE FLUID SPRAY AGAINST INFRARED HEAT SEEKING MISSILE

CROSS-REFERENCE TO RELATED APPLICATIONS

1. U.S. Pat. No. 6,098,402, January 1990, Sawruk, Stephan D.

FEDERALLY SPONSORED RESEARCH

None

SEQUENCE LISTING OR PROGRAM

Not Applicable

BACKGROUND

1. Field of Invention

This embodiment relates to a countermeasure process whereby military and civil commercial aircraft under attack by an anti aircraft infrared heat seeking missile is able to effectively deflect attacking missile by dispensing appropriate and distinctive fluid spray behind its tailpipe in the wake of exhaust plume, and into the path of trailing hostile missile.

Military and civil aircraft could come under an attack by a hostile infrared heat seeking missile. Such infrared heat seeking missile homes in on the target aircraft heat source such as the jet engine exhaust, and is fused to detonate when it approaches said target very close or enters its tailpipe. To accomplish said tracking and eventual detonation in close proximity to target, typical heat seeking missile uses combination of passive guidance control system to keep the infrared emission from the target in sight and an active optical target detector to determine when it is within the correct detonation range. This requires that the missile maintain an unobstructed line of sight with target aircraft heat source, referred to as being locked on, prior to launch and during its entire flight to this target.

The active optical target detector consists of numerous laser emitter and sensor diodes arranged around the outside of the missile airframe immediately behind the flight fins. When the missile is in flight, the active optical detector is constantly emitting number of laser beams at a set frequency forward in a radial pattern and in the direction of the target aircraft. When the missile approaches sufficiently close to its intended target, the laser beams will reflect off some part of the aircraft body and be detected by its sensor diodes. The optical target detector then recognizes that missile is at correct burst range and triggers its annular blast fragmentation warhead to detonate and destroy the intended target.

The passive heat seeking elements for the guidance control are located and housed in the nose of missile and behind the infrared filter plastic dome.

By applying appropriate and distinctive substance in a fluid spray to coat this plastic dome as described in present and preferred embodiment, the received infrared energy sources from the targeted aircraft would be sufficiently distorted and degraded to blind and hinder effective missile guidance control.

Of the two systems on the missile which are important to neutralize, the passive guidance control in the seeker, located behind the plastic dome, presents a much larger target area than the laser emitter and sensor diodes of the optical target detector, and is therefore a primary candidate and easier of the two on which to focus the countermeasure process in this embodiment, using the said fluid spray.

2. Description of Prior Art

There are currently several proposed and applied countermeasures generally known and available to the targeted aircraft:

1. Ejecting secondary bright infrared sources and dispensable, such as flare salvo and infrared beacons, to draw heat seeking missile away from targeted aircraft and towards these secondary decoys.
2. Steering aircraft into sun to draw heat seeking missile in that direction and then executing rapid evasive maneuver away from missile trajectory.
3. Shining infrared laser beams rearward of aircraft and into path of trailing missile, intended to confuse missile guidance control system or to cause its active optical target detector to initiate a premature detonation but at a safer distance.
4. Significantly cooling exhaust gases to as near the ambient air temperature surrounding the aircraft as possible, to reduce the targeted aircraft infrared emission. Such technique is referred to as cloaking or infrared stealth masking device.

These prior art countermeasure process currently available to targeted aircraft suffer from several significant drawbacks:

1. Not all countermeasures are universally, economically and readily available or applicable to both military and civil aircraft targets.
2. Available countermeasures are dependent on time of day, altitude and weather conditions. For example, using sun for a decoy would be ineffective countermeasure at night or when thick clouds hide the sun. At such times, the targeted aircraft infrared heat emission is the predominant source to the attacking missile guidance control system.
3. Available countermeasures are dependent on agility and structural integrity of targeted aircraft, along with ability of aircraft pilot to detect, react and execute rapid and intricate evasive maneuvers against large acceleration forces. A civil or military transport aircraft would be unable to execute rapid and agile evasive maneuver in a manner that a military jet fighter could. In addition, even a military jet fighter may not be able to evade the attacking heat seeking missile under all conditions, considering that the missile offers little opportunity for warning before impact.
4. Applicable countermeasures are dependent on targeted aircraft rearward pulsing laser beams effectively hitting, jamming missile guidance control system, and its optical target detection in time to prevent hitting the targeted aircraft.
5. Countermeasure, whereby the targeted aircraft is emitting laser beams rearward to trick attacking missile optical target detector to initiate a premature detonation may not be effective if the countermeasure system of the missile is immune to such targeted aircraft defensive measures.
6. Effectiveness of aircraft countermeasures are dependent upon knowing existing missile infrared parameters and detailed characteristics of its guidance and optical target detection systems, along with anticipating timely new advances in missile's own countermeasure capability and the ability to quickly and economically compensate its own defenses in response.

7. Expensive, complicated and lengthy retrofit and modifications of existing aircraft for cooling exhaust gases may not be well suitable for most civil and military aircraft.

For example, in U.S. Pat. No. 6,098,042 to Sawaruk (1990) indicates that his present preferred embodiment is a complex system made up of multiple subsystems which may be used in whole or in part to accomplish various missions with regard to infrared suppression on a variety of vehicles. An example of which would be external cryogenic ejector nozzles applied to rotary aircraft exhaust pipes.

SUMMARY

In accordance with the preferred embodiment, military transport and civil commercial aircraft applying appropriate and distinctive substance in a fluid spray behind tailpipe and in its wake of exhaust plume provides an effective countermeasure process against an attacking infrared heat seeking missile. The said countermeasure process can be successfully integrated with the existing defensive measures to provide increased probability of survival. Furthermore, the present embodiment of the targeted aircraft countermeasure is not vulnerable to missile's own counter-countermeasures, as the said missile's countermeasures are either mostly or wholly dependent on receiving unaffected and undistorted infrared sources through its infrared filter plastic dome, to maintain correct trajectory to the target aircraft.

DRAWING

Figure

FIG. 1 shows the block diagram of the fluid spray equipment in the preferred embodiment.

DRAWING

Referenced Numerals

1 Electrical system supply cable
2 Manual or automatic activation command signal cable
3 Electrical power and control circuit
4 Redundant electrical power for pump
5 Electrical power control wires for solenoid
6 Reservoir for appropriate and distinctive substance to be dispersed as fluid spray
7 Electrical high compression pump
8 High pressure non corrosive hose
9 Electrical solenoid operated valve
10 Electrical solenoid
11 Non corrosive tubing
12 Manifold
13 Adjustable nozzles

DETAILED DESCRIPTION

FIG. 1—Preferred Embodiment

FIG. 1 illustrates a preferred embodiment of the fluid spray equipment in a block diagram form, one for each aircraft tailpipe.

The fluid equipment consists of a dedicated electrical power and control circuit (3). The electrical power and control to the high pressure pump (7) is delivered through a separate and redundant electrical conductors running through flexible conduits (4). The high pressure pump (7) is connected to the fluid reservoir (6). The fluid reservoir contains sufficient quantity of appropriate and distinctive fluid to repel multiple missile attacks.

The pump outlet consists of a high pressure hose (8), connected to a valve (9), which is controlled by an electrically operated solenoid (10). The solenoid opens if power to it fails, and is operated through the control wires (5). The outlet of the valve is through a high pressure hose (8) and into a manifold (12) from which several tubes (11) diverge into a radial pattern around the aircraft tailpipe and terminating into adjustable nozzles (13). The nozzles are aimed rearward in effort to produce fluid spray carried in the wake of exhaust gas plumes as far rearward as possible. Furthermore, the nozzles are positioned to take best advantage of exhaust gases in the wake, without adversely affecting the thrust and maneuverability of the aircraft.

The electrical power and control circuit receives electrical power through the electrical system power supply cable (1). In addition, both the manual and automatic activation command signal is supplied through the cable (2).

Operation—FIG. 1

When the aircraft fluid spray countermeasure process is activated, electrical power and control circuit (3) opens the solenoid operated valve (9) through control wires (5) prior to activating pump (7). The pumped high pressure fluid travels through high pressure hose (8), manifold (12) and non corrosive tubing (11) into nozzles (13) for atomization of fluid into spray before dispersal into tailpipe exhaust stream. The fluid mist would be carried rearward by exhaust wake to hit and adhere to infrared filter plastic dome in the nose of the attacking missile and disrupt its infrared guidance system.

Advantages

Accordingly, several advantages of the present preferred embodiment over prior art countermeasure process are (a) readily and economically applicable to both military and civil aircraft of wide range of configurations, with considerably fewer required aircraft alterations, (b) not dependent on such variables as time of day, altitude and weather conditions for its effectiveness. The embodied fluid spray can be quickly released into exhaust plume to initiate its countermeasure action, (c) effective and applicable against any type of attacking missile that is dependent entirely or in part on the targeted aircraft exhaust plume infrared heat emission for tracking, (d) not dependent upon missile infrared parameters and detailed characteristics of its guidance system as long as the missile is receiving guidance information through an infrared filter dome which can be readily rendered blind with appropriate fluid spray, (e) the activation control of the embodied fluid spray can be readily integrated in the existing aircraft countermeasure process against the attacking heat seeking missile, and be applied automatically or manually.

We claim:

1. A defensive process for flying aircraft, the process comprising:
dispersing a distinctive substance as fluid spray by a flying aircraft against an attacking infrared heat seeking missile after the attacking missile is detected,
wherein the distinctive substance is dispersed under high pressure rearward of the flying aircraft and into a path of the attacking missile.

2. The process of claim 1, wherein the dispersed distinctive substance coats a plastic dome covering a guidance system of the attacking missile with a layer that is sufficiently opaque to infrared wavelength to cause distortion, disruption or hindrance to the guidance system.

3. The process of claim 2, wherein the layer of distinctive dispersed substance adversely effects reception of infrared information by the guidance system of the attacking missile to provide resistance to any improved guidance homing parameters that are used by a computer program of the attacking missile which relies upon the attacking missile receiving continuous, undistorted and unhindered infrared signal from a targeted flying aircraft through the plastic dome of the attacking missile.

4. The process of claim 1, further comprising retrofitting the flying aircraft with a spray system configured to spray the distinctive substance, said spray system being automatically or manually activateable by pilots of the flying aircraft.

5. The process of claim 2, wherein said distortion, disruption or hindrance to the guidance system is independent of time of day, altitude, or weather conditions.

6. The process of claim 1, wherein the distinctive substance is of such chemical property that:

(a) the distinctive substance does not freeze at normal operational altitude of the flying aircraft or upon being dispersed from a nozzle under high pressure and velocity, (b) the distinctive substance remains in a state of fluid spray sufficiently long enough to reach the attacking missile, and (c) the distinctive substance adheres to and coat a target surface area of the attacking missile in such a manner that it effectively blocks or reduces reception of infrared heat waves originating from an exhaust of the flying aircraft to such level to render ineffective a guidance system of the attacking missile.

7. The process of claim 1, wherein the distinctive substance is of such chemical property that the distinctive substance does not freeze at normal operational altitude of the flying aircraft or upon being dispersed from a nozzle under high pressure and velocity.

8. The process of claim 1, wherein the distinctive substance is of such chemical property that the distinctive substance remains in a state of fluid spray sufficiently long enough to reach the attacking missile.

9. The process of claim 1, wherein the distinctive substance is of such chemical property that the distinctive substance adheres to and coat a target surface area of the attacking missile in such a manner that it effectively blocks or reduces reception of infrared heat waves originating from an exhaust of the flying aircraft to such level to render ineffective a guidance system of the attacking missile.

\* \* \* \* \*